United States Patent [19]
Kieper

[11] 3,964,322
[45] June 22, 1976

[54] POWER TRANSMISSION

[76] Inventor: Reinhold R. Kieper, 19160 Wood St., Melvindale, Mich. 48122

[22] Filed: Feb. 27, 1975

[21] Appl. No.: 553,598

[52] U.S. Cl. .................................................. 74/55
[51] Int. Cl.² ........................................ F16H 25/08
[58] Field of Search .................. 123/44 B, 44 C, 43, 123/45; 74/84, 55

[56] References Cited
UNITED STATES PATENTS

| | | | |
|---|---|---|---|
| 1,112,338 | 9/1914 | Tacchi | 123/44 B |
| 1,953,964 | 4/1934 | Laskowitz | 74/84 S |

*Primary Examiner*—Benjamin W. Wyche
*Assistant Examiner*—Wesley S. Ratliff, Jr.
*Attorney, Agent, or Firm*—Cullen, Settle, Sloman & Cantor

[57] ABSTRACT

A power transmission includes a chambered housing having a horizontal axis with a rotatable crankshaft disposed therethrough and outwardly of the housing independently mounted upon a suitable support. A pair of diametrically opposed radial rods on said crankshaft pivotally mount a pair of pistons which on rotation of the crankshaft are yieldably biased outwardly. Cam rollers on said pistons bear against cam bore within said housing. Said bore includes a circular portion of maximum radius throughout 180° approximately, merging into a cam surface gradually reduced to minimum dimension which merges into a circular pivotally adjustable segment portion of minimum radius throughout less than 90°. The irregular cam bore provides for one piston traversing the maximum radius of said cam bore an increased leverage with respect to the other piston simultaneously traversing the cam portions and reduced radius portions of said bore.

8 Claims, 4 Drawing Figures

3,964,322

POWER TRANSMISSION

RELATED APPLICATIONS

This application is an improvement over my co-pending application Ser. No. 451,477 filed Mar. 15, 1974, now U.S. Pat. No. 3,903,749

BACKGROUND OF THE INVENTION

Heretofore, various types of power transmissions have been provided wherein, weights have been mounted for radial adjustment with respect to a rotary housing and wherein, cam surfaces have been provided for controlling the radial position of a radially adjustable member.

The devices in the prior art are complicated and involved. Examples of such patents are as follows:

UNITED STATES PATENTS

| | |
|---|---|
| 2,969,076 | 3,392,634 |
| 3,241,463 | 1,636,998 |

FRENCH PATENT 809,374

BRITISH PATENT

1750.

BRIEF DESCRIPTION OF THE INVENTION

It is an object of the present invention to provide an improved power transmission which will operate on principles of gravity and centrifugal force and wherein, pistons mounted upon a crankshaft within a housing are pivotally adjustable and respond to an irregular cam surface bore upon the interior of said housing to provide increased leverage of one piston when moving along a portion of the bore of maximum radius with respect to a diametrically opposed piston moving along a bore of reduced radius or dimension to, thus, provide additional rotative thrust upon said crankshaft.

It is an object of the present invention to provide a novel support mounting for such transmission and the housing therefore, by which the housing may be rotatively advanced or retracted rotatively with respect to the pistons on said crankshaft for increasing or decreasing the speed thereof.

It is another object to provide an improved piston and rod arrangement whereby the pistons mount rollers on their outer surfaces for cooperative registry with an integral bore of varying radii and wherein, the pistons on rotation are normally biased outwardly against said bore are adapted for pivotal movements relative to said piston rods.

It is another object to provide a power supply in connection with a power transmission as an improvement over present internal combustion engines, and for the reduction of air pollution.

These and other objects will be seen from the following specification and claims in conjunction with the appended drawing.

THE DRAWING

It will be understood that the above drawing illustrates merely a preferred embodiment of the invention and other embodiments are contemplated within the scope of the claims hereafter set forth.

DETAILED DESCRIPTION OF THE INVENTION

Figure 1:
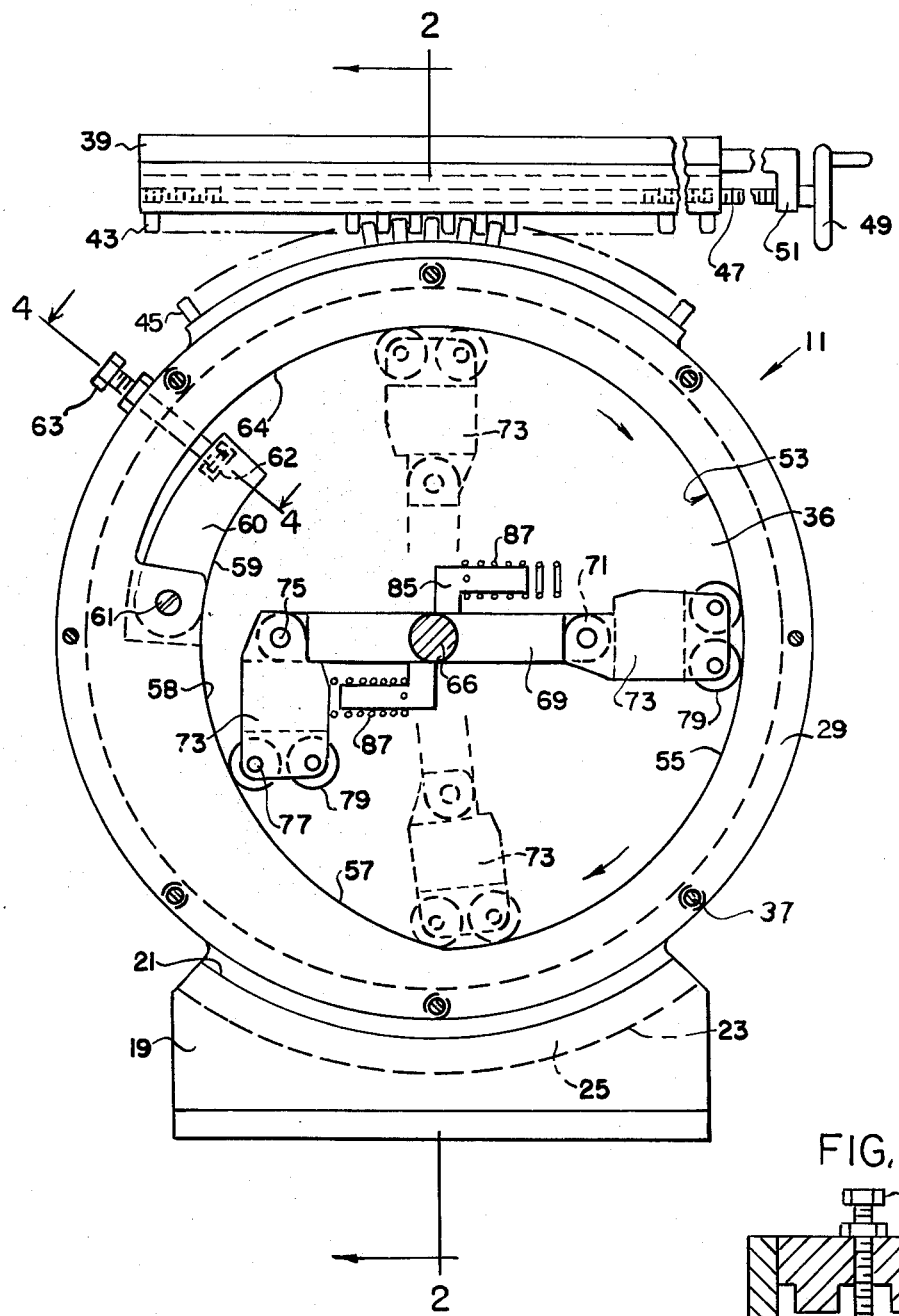
FIG. 1 is a fragmentary front elevational view of the present power transmission and housing with its front cover removed for clarity.
Figure 4:
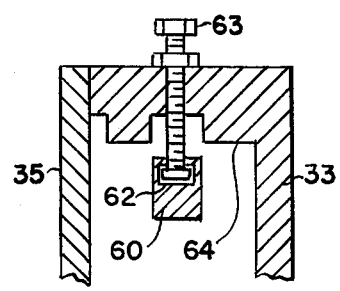
FIG. 4 is a section taken in the direction of arrows 4—4 of FIG. 1.
Figure 2:
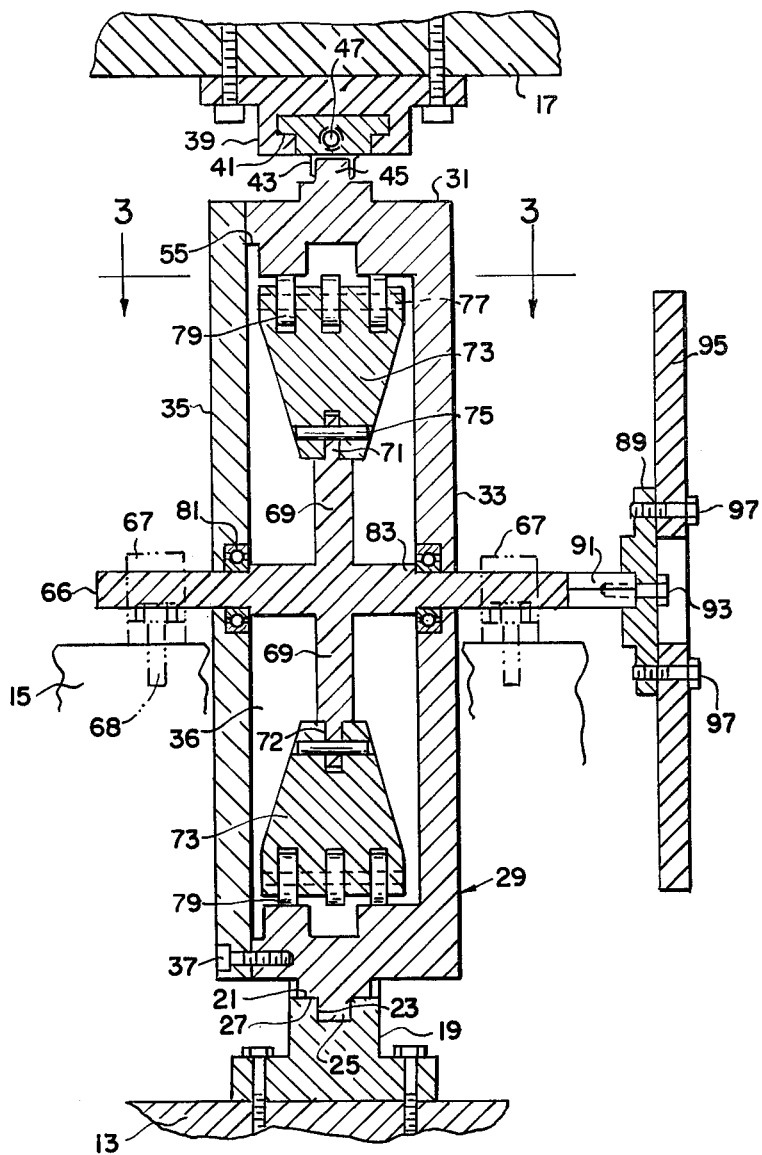
FIG. 2 is a vertical section taken in the direction of arrows 2—2 of FIG. 1.
Figure 3:
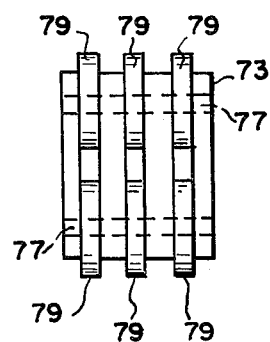
FIG. 3 is an end view of the piston assembly taken in the direction of arrows 3—3 of FIG. 2.

Referring to the drawing, the present power transmission generally designed at 11, FIG. 1, involves three supports fragmentarily designated at 13, 15 and 17, FIG. 2. The base 19 is mounted upon support 13 and is suitably secured thereto and includes at its upper surface a concave circularly shaped bearing surface 21 and formed therein, a similarly shaped channel 23. The power transmission includes housing 29 with a cylindrical portion 31. Upon the lower surface portion of annular wall 31, there is provided arcuate or circularly shaped slide bearing 27 adapted for cooperative sliding surface registry with the bearing surface 21. Intermediate the sides of bearing 27 is a downwardly projecting similarly shaped guide 25 which cooperatively and guidably projects into arcuate channel 23.

Said housing 29 includes end wall 33 and at its opposite end the removably front plate 35 secured thereon by a series of fasteners 37 to define chamber 36.

The support for said housing includes an additional means by which the housing may be rotatively adjusted forwardly or rearwardly with respect to the base support 19, FIG. 1. For this purpose, a rack support 39 is arranged above said housing and is secured to support 17, fragmentarily shown, with suitable fasteners and includes at its undersurface an undercut T slot 41. A rack 43 of similar shape is slidably nested within said T slot and includes a series of gear teeth incooperative mesh with a corresponding arcuate gear sector 45 on an upper surface portion of housing wall 31, FIGS. 1 and 2.

The feed screw 47 with suitable control handle 49 on one end is retained against longitudinal adjustment as at 51, FIG. 1, and threadedly engages said rack gear 43. Rotative adjustment of the hand wheel 49 in one direction or other will cause the housing 29 to rotatively and slidably advance or retract with respect to support 19.

Housing 29 has a cam bore 53 which consists of three sectors, for illustration. As shown in FIG. 1 there is a circular portion 55 of maximum radius which extends throughout 225° approximately. This circular portion gradually merges with the cam surface 57 of reduced center distance with respect to the axis of the housing and this surface, in turn, merges with an arcuate portion of minimum radius as at 58, FIG. 1. The surface area which includes the cam surface 57 and the arcuate portion 58 extends throughout an arc of approximately 90°. The latter merges with an arcuate portion 59 of 45° approximately on sector 60 pivoted upon the housing at 61. The remainder of the cam surface at 64 is at a maximum radius merging with cam surface 55. The radius of surface 59 may be regulated by adjusting bolt 63 which is threaded radially into the cylinder wall and connected at 62 to the free end of sector 60.

A crankshaft 66 is journalled and supported on suitable bearings 67 anchored at 68 upon the supports 15 outside and independent of housing 29. Said crankshaft includes at least one pair of diametrically arranged radially extending square rods 69 which have radial tongues 71. These extend into slotted portions 72 of pistons 73 and are pivotally connected thereto by pins 75. There may be additional pairs of said pistons and rods.

As shown in the drawing, rollers 79 are provided upon and radially outward of the corresponding piston 73 for cooperative registry with cam bore 55, 57, 58, 59 and 64. This controls pivotal inward movements of the pistons with respect to their support rods. On rotation of crankshaft 69, centrifugal force normally urges the pistons radially outward so that the respective rollers are at all times in continuous operative engagement with the cam bore 53 within said housing.

Stud shafts 77 in the pistons 73 journal the respective rollers 79. Axially aligned end thrust bearings 81 are nested within end wall 33 and front plate 35 of said housing to cooperatively receive intermediate portions of the crankshaft and with respect to the end thrust shoulders 83 formed therein.

OPERATION

In operation, upon initial rotation of crankshaft 66 in a clockwise direction, the piston 73 at the top of FIG. 1 is moving with its rollers along the cam bore 55 of maximum radius, and, thus, at an increased leverage with respect to the diametrically opposed piston. The latter has been moved pivotally inward by the cam surface 57. A mechanical advantage is provided exerting a rotary thrust upon the crankshaft.

The movement of each piston is modified and assisted by forces of gravity and centrifugal force for rotation in the direction shown by the arrows, FIG. 1.

The showing of the pistons in solid lines at 90° out of the initial position illustrates the leverage achieved between the first and second piston wherein, one piston is moving at a greater center distance than the other piston and has an increased leverage over the other piston.

The crankshaft can be speeded up or slowed down by advancing the housing 29 in the direction of rotation by actuation of the lead screw 47–49 in one direction or the other. The crankshaft is supported and journalled independently of the housing for rotating adjustment as desired.

The rack gear 43 has been illustrated as one means for rotatively advancing or retracting housing 29 with respect to the crankshaft. Any suitable means may be employed which has the effect of slidably and rotatively adjusting the housing with respect to its arcuate support 19.

A pair of opposed L-shaped spring guides 85 project radially from the inner ends of rod 69 and mount the yieldable stop springs 87. Just as soon as the left piston 73 passes the segment 60, stop spring 87 will urge said piston to an actually extended position, as at the top of FIG. 1.

Adjustment of bolt 63 will regulate the run-out angle of surface 59 as the adjacent piston passes over its free end.

Instead of the spring being mounted on the spring guide, it may be nested within the piston so as to operatively engage and thereafter react with the end of said spring guide. This reaction will occur when the left piston, FIG. 1, has moved so as to engage the end portion of the adjustable sector 60. In the position shown, the piston merely loosely engages the spring, and at that point, spring 87 is not under compression.

As shown in FIG. 2, crankshaft 66 terminates in a square end 91 for nesting within a square opening in hub 89 which is secured thereto by fastener 93. Flywheel 95 is mounted on said hub and secured thereto by fasteners 97.

Having described my invention, reference should now be had to the following claims.

I claim:

1. A power transmission comprising a base support; a chambered cylindrical housing mounted on said support, having an end wall and a removable front plate with aligned apertures in said wall and plate on a horizontal axis;
a rotatable crankshaft axially disposed through said housing with portions of said crankshaft journalled and mounted on supports on the exterior and independent of said housing;
at least one pair of equally spaced rods on and projecting radially from said crankshaft within said housing;
a radially adjustable piston pivotally mounted on each rod on an axis parallel to the crankshaft and yieldably biased outwardly in axial alignment with said rod on rotation of said crankshaft;
spring means on each rod engageable with its piston when pivoted approximately 90° with respect to said rod adapted to bias said piston toward alignment with its rod;
cam rollers journalled upon said pistons on axes parallel to the housing axis;
said housing having an arcuate cam bore operatively engaging said rollers;
said bore including a circular portion of uniform maximum radius throughout 225°, approximately; merging into a cam surface of reduced minimum dimension which merges into a circular portion of minimum radius for 90°, approximately;
and a run out arcuate sector of 45°, approximately starting from said minimum radius, at one end pivotally mounted on said housing and at its other end, having a radial step surface extending towards said cam bore at its maximum radius;
each piston as it traverses the circular cam bore portion of maximum radius, being in alignment with its rod, and as it progressively traverses the cam surface of reduced minimum dimension and said run out sector, being pivoted progressively at angles up to 90° relative to its rod;
whereby one piston when traversing the bore of maximum radius has an increased leverage with respect to the other piston simultaneously traversing the cam portions and reduced radius portions of said bore and sector.

2. In the transmission of claim 1, the mounting of said housing including a concave circularly shaped bearing surface on said base support with an intermediate similarly shaped channel; an arcuate depending bearing of similar shape slidably positioned upon said bearing surface; and a similarly shaped guide flange depending from said bearing guidably and retainingly nested in said channel; whereby said housing may be angularly and rotatably advanced and retracted relative to said support.

3. In the transmission of claim 2, operative means engagable with said housing at its upper portion for rotating said housing relative to said axis.

4. In the transmission of claim 3, said latter means including an arcuate gear segment on said housing; and a manually controlled reciprocal rack gear in mesh with said gear segment.

5. In the transmission of claim 1, the mounting of said pistons on said rods including a tongue on each rod projected into each piston; and a transverse shaft on said piston extending through said tongue.

6. In the transmission of claim 1, said cam rollers being nested within said pistons and rotatable on axes parallel to said axis; and a pair of trunion shafts extending through said pistons; said rollers being respectively journalled on said shafts.

7. In the transmission of claim 1, said springs means including a pair of opposed spring seats extending from opposite sides of said rods and radially outward parallel to said rods; and coiled compression stop springs mounted on said seats and projecting outwardly thereof adapted to operatively and resiliently engage said pistons when pivoted normally of said corresponding rods.

8. In the transmission of claim 1, said spring means including a pair of opposed spring seats extending from opposite sides of said rods and radially outward parallel to said rods; and stop springs interposed between said pistons and spring seats adapted to operatively and resiliently engage said seat as said piston passes over said sector.

* * * * *